(12) United States Patent
Kim et al.

(10) Patent No.: US 10,640,021 B2
(45) Date of Patent: May 5, 2020

(54) CUSHION COVER FOR VENTILATION SEAT

(71) Applicant: Hyundai Dymos Incorporated, Seosan-si, Chungcheongnam-do (KR)

(72) Inventors: Do Hyung Kim, Yongin-si (KR); Taek Jun Nam, Yongin-si (KR); Ho Sub Lim, Seoul (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 111 days.

(21) Appl. No.: 15/782,221

(22) Filed: Oct. 12, 2017

(65) Prior Publication Data
US 2018/0126880 A1 May 10, 2018

(30) Foreign Application Priority Data
Nov. 4, 2016 (KR) .......................... 10-2016-0146732

(51) Int. Cl.
*B60N 2/56* (2006.01)
*B60N 2/58* (2006.01)

(52) U.S. Cl.
CPC ......... *B60N 2/5628* (2013.01); *B60N 2/5657* (2013.01); *B60N 2/5664* (2013.01); *B60N 2/5875* (2013.01); *B60N 2205/30* (2013.01)

(58) Field of Classification Search
CPC .. B60N 2/5628; B60N 2/5657; B60N 2/5664; B60N 2/5875; B60N 2/5891
See application file for complete search history.

(56) References Cited

U.S. PATENT DOCUMENTS

| 7,587,901 | B2 * | 9/2009 | Petrovski | A47C 7/74 |
| | | | | 62/3.3 |
| 8,585,137 | B2 * | 11/2013 | Park | B60N 2/5642 |
| | | | | 297/180.13 |
| 2002/0170902 | A1 * | 11/2002 | Check | B29C 65/02 |
| | | | | 219/217 |
| 2009/0033130 | A1 * | 2/2009 | Marquette | A47C 7/74 |
| | | | | 297/180.15 |

(Continued)

FOREIGN PATENT DOCUMENTS

| CN | 101811459 A | 8/2010 |
| CN | 101879872 A | 11/2010 |
| JP | 2013-233860 | 11/2013 |

(Continued)

OTHER PUBLICATIONS

Chinese Office Action dated Aug. 13, 2019 from the corresponding Chinese Application No. 201711019969.3, 9 pp.

*Primary Examiner* — David R Dunn
*Assistant Examiner* — Tania Abraham
(74) *Attorney, Agent, or Firm* — Brinks Gilson & Lione

(57) ABSTRACT

A cushion cover for a ventilation seat includes: a first adhesive layer including an upper surface coupled to a lower surface of a cushion part of the ventilation seat, the lower surface of the cushion provided with an air flow channel; a non-permeable layer made of a non-permeable material and including an upper surface coupled to a lower surface of the first adhesive layer to block the air flow channel of the lower surface of the cushion part from outside; and a protective layer coupled to a lower surface of the non-permeable layer to direct friction between the non-permeable layer and a seat structure.

10 Claims, 3 Drawing Sheets

(56) References Cited

U.S. PATENT DOCUMENTS

Figure 1:
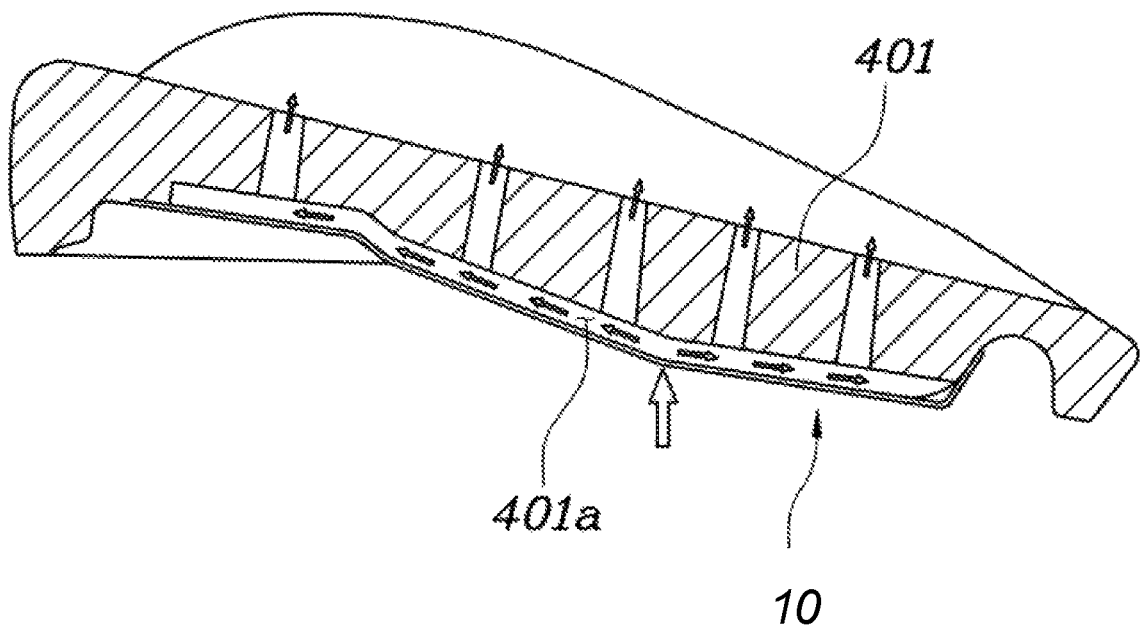

2010/0327636 A1* 12/2010 Stoll ................. B60H 1/00285
                                                                297/180.1
2013/0264742 A1* 10/2013 Ota .................... B29D 99/0092
                                                                  264/266

FOREIGN PATENT DOCUMENTS

KR    10-2016-0025096        3/2016
KR      10-1666422          10/2016

* cited by examiner

CUSHION COVER FOR VENTILATION SEAT

CROSS REFERENCE TO RELATED APPLICATION

This application claims priority to and the benefit of Korean Patent Application No. 10-2016-0146732, filed on Nov. 4, 2016, which is incorporated herein by reference in its entirety.

FIELD

The present disclosure relates to a cushion cover for a ventilation seat of a vehicle.

BACKGROUND

The statements in this section merely provide background information related to the present disclosure and may not constitute prior art.

In general, a ventilation seat is provided with a separate cover at the lower portion of a cushion part so that air is circulated without escaping.

Disclosed ventilation systems for a seat use a rigid plastic cover. However, the rigid cover made of a plastic material undermines seating comfort when a passenger sits on the seat. Further, the cost of the injection mold invested to manufacture the cover of the plastic material increases the manufacturing cost and consequently increases the unit price of the product, which causes a problem of lowering the cost competitiveness of the entire seat product.

We have discovered that the difference in the deformation amount of the cover with different material properties from the seat pad deteriorates performance, such as the cover being separated from the cushion part when sitting, thereby losing airtightness.

The foregoing is intended merely to aid in the understanding of the background of the present disclosure, and is not intended to mean that the present disclosure falls within the purview of the related art that is already known to those skilled in the art.

SUMMARY

The present disclosure proposes a cushion cover for a ventilation seat, in particular, the cushion cover provides a flow path by sealing an air flow channel of a cushion part of a seat and is deformed in accordance with deformation of the seat, thereby improving a passenger's feel of seat.

In one aspect of the present disclosure, a cushion cover for a ventilation seat may include: a first adhesive layer including an upper surface coupled to a lower surface of a cushion part of a ventilation seat, the lower surface of the cushion part provided with an air flow channel; a non-permeable layer made of a non-permeable material and including an upper surface coupled to a lower surface of the first adhesive layer configured to block the air flow channel of the lower surface of the cushion part from outside; and a protective layer coupled to a lower surface of the non-permeable layer to prevent direct contact between the non-permeable layer and a seat structure.

The cushion cover may further include a second adhesive layer provided between the non-permeable layer and the protective layer to couple the non-permeable layer and the protective layer together.

Both the first adhesive layer and the second adhesive layer may be in a form of a double sided adhesive tape.

Both the first adhesive layer and the second adhesive layer may be in a form of a non-permeable adhesive.

The non-permeable adhesive may be in a form of an acrylic pressure sensitive adhesive (PSA).

The non-permeable layer may be made of at least one of an olefin based resin, a urethane based resin, a polyethylene terephthalate (PET) resin, or a polypropylene (PP) resin.

The protective layer may be made of a nonwoven fabric.

The protective layer may be made of a nonwoven fabric, and the non-permeable layer may be made of a thermoplastic resin film so as to permeate through surface voids in an upper surface of the nonwoven fabric layer, such that the non-permeable layer and the protective layer are thermally fused together.

The protective layer may be made of a nonwoven fabric, and the non-permeable adhesive may be a liquid with fluidity so as to permeate through surface voids in an upper surface of the nonwoven fabric layer, such that the non-permeable layer and the protective layer are coupled together.

The first adhesive layer may be made of a non-permeable adhesive, and the non-permeable adhesive may be a liquid with fluidity so as to permeate through surface voids in the lower surface of the cushion part of the ventilation seat, such that the cushion part of the ventilation seat and the non-permeable layer are coupled together.

According to the cushion cover for a ventilation seat of the present disclosure, it is advantageous in that airtightness of the air flow channel is maintained despite repeated deformation due to passengers getting on and off, there is no discomfort during sitting, and the manufacturing cost can also be lowered.

Further areas of applicability will become apparent from the description provided herein. It should be understood that the description and specific examples are intended for purposes of illustration only and are not intended to limit the scope of the present disclosure.

DRAWINGS

Figure 2:
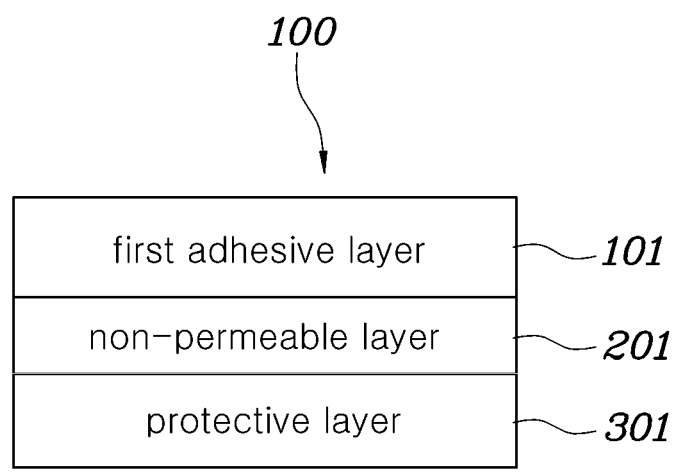
Figure 3:
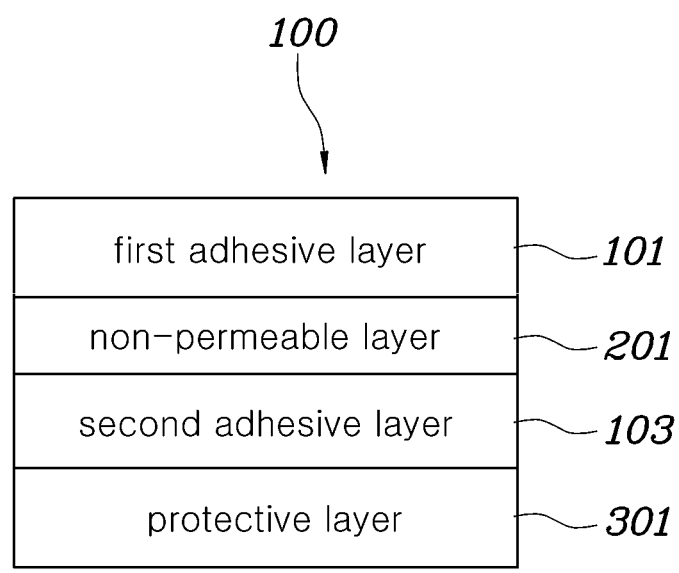

In order that the disclosure may be well understood, there will now be described various forms thereof, given by way of example, reference being made to the accompanying drawings, in which:

FIG. 1 is a an arrangement view showing a cushion cover for a ventilation seat in one form of the present disclosure; and FIGS. 2 to 3 are sectional diagrams showing the cushion cover for a ventilation seat in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a an arrangement view showing a cushion cover for a ventilation seat in one form of the present disclosure; and FIGS. 2 to 3 are sectional diagrams showing the cushion cover for a ventilation seat as one form of the present disclosure.

A cushion cover 100 for a ventilation seat 10 includes: a first adhesive layer 101 configured such that an upper surface thereof is coupled to a lower surface of a cushion part 401 of a ventilation seat, the lower surface provided with an air flow channel 401a; a non-permeable layer 201 made of a non-permeable material, and configured such that an upper surface thereof is coupled to a lower surface of the first adhesive layer 101 to block the air flow channel 401a of the lower surface of the cushion part 401 from an outside; and a protective layer 301 coupled to a lower surface of the non-permeable layer 201 to prevent direct contact between the non-permeable layer 201 and a seat structure.

The non-permeable layer 201 may be of an olefin based resin, a urethane based resin, a polyethylene terephthalate (PET) resin, or a polypropylene (PP) resin, but not limited thereto.

As a material of the non-permeable layer, PP based resin added with Ethylene-Vinyl Acetate (EVA) may be used. In this case, it is possible to secure ductility through EVA being added to PP. Meanwhile, a polyethylene (PE) based resin added with EVA is possible. In this case, PE is used to secure more ductility than PP.

Further, in one form, PP based resin added with PP elastomer may be used. In this case, weak heat resistance of EVA is complemented EVA, since EVA breaks easily during heating and tears in directions due to having a crystal orientation. PP elastomer has no directionality, whereby it is possible to reduce defect rate, possible to ensure durability, and possible to complement heat resistance, simultaneously.

In another form, PE based resin added with PE elastomer may be considered. In this case, ductility is secured but the heat resistance is insufficient. Further, urethane only may also be considered, but in this case urethane is good for tensile strength, but it has high cost, difficulty in molding, and poor assemblability due to flexibility. Alternatively, a soft sheet made of composite material or single material may be used.

In the ventilation seat 10, the air flow channel 401a is formed in the cushion part 401, and the lower portion of the cushion part 401 is sealed by using the cushion cover 100, such that conditioned air is supplied to the seating surface of the seat.

Conventionally, a rigid cushion cover of such as a plastic material is used to seal the lower portion of the cushion part 401. However, the rigid cover made of a plastic material undermines the sitting comfort when a passenger sits on the seat. Further, the cost of the injection mold invested to manufacture the cover of the plastic material increases the manufacturing cost and consequently increases the unit price of the product, which causes a problem of lowering the cost of the entire seat product.

The cushion cover 100 for a ventilation seat 10 uses the non-permeable layer 201 of an olefin based resin, a urethane based resin, a polyethylene terephthalate (PET) resin, or a polypropylene (PP) resin, which is in the form of a film with excellent flexibility and shielding performance. Thereby, by eliminating the height, thickness, and strength of the plastic cover that can affect passengers during sitting, and by applying an adhesion type cover in a planar shape, it is possible to reduce the effect on the passengers' feel of seat.

Further, since the non-permeable layer 201 of the cushion cover 100 is made of an olefin based resin, a urethane based resin, a polyethylene terephthalate (PET) resin, or a polypropylene (PP) resin, which is soft and has with excellent flexibility, even if the lower portion of the cushion part 401 is formed into a complicated shape, it is possible to attach the non-permeable layer therealong. Accordingly, the non-permeable layer can be attached without being influenced greatly by the shape of the lower portion of the cushion part 401, and even if the type and shape of the cushion part 401 are various, the cushion cover 100 can be unified and used in common, thereby reducing manufacturing cost.

The cushion cover may further include a second adhesive layer 103 provided between the non-permeable layer 201 and the protective layer 301 to couple the non-permeable layer 201 and the protective layer 301 together. The first adhesive layer 101 and the second adhesive layer 103 may be in the form of a double sided adhesive tape. The first adhesive layer 101 and the second adhesive layer 103 may be in the form of a non-permeable adhesive. The non-permeable adhesive may be in the form of an acrylic pressure sensitive adhesive (PSA).

The non-permeable adhesive may be a liquid with fluidity so as to permeate through surface voids in the lower surface of the cushion part 401 of the ventilation seat, such that the cushion part 401 of the ventilation seat and the non-permeable layer 201 are coupled together.

Referring to FIGS. 1-2, the cushion part 401 of the ventilation seat 10 and the non-permeable layer 201 are coupled through the non-permeable first adhesive layer 101.

The present disclosure is configured such that the non-permeable layer 201 is made of a film type olefin based resin, a film type urethane based resin, a film type polyethylene terephthalate (PET) resin, or a film type polypropylene (PP) resin, whereby it is possible to secure a sufficient bonding force with a single adhesive layer, for example, a double sided adhesive tape, but not limited thereto.

However, in order to further increase a bonding force between the cushion part 401 and the non-permeable layer 201, a non-permeable liquid adhesive with fluidity is used so as to permeate through surface voids in the lower surface of the cushion part 401 and be coupled thereto, such that the bonding force between the two layers is increased. Thereby, it is possible to secure airtightness of the cushion cover 100 for a ventilation seat although passengers repeatedly get on and off.

The protective layer 301 may be of a nonwoven fabric. The protective layer 301 may be of a nonwoven fabric, and the non-permeable adhesive may be of a liquid with fluidity so as to permeate through surface voids in an upper surface of the nonwoven fabric layer, such that the non-permeable layer 201 and the protective layer 301 are coupled together.

Unlike a conventional cushion cover made of a rigid plastic, the cushion cover 100 having the soft non-permeable layer 201 as in the present disclosure may have a durability problem in itself.

According to passengers' repeated getting on and off, the cushion cover 100 may be rubbed against or scratched by various seat structures at the lower surface of the cushion part 401. Here, when the non-permeable layer 201 is damaged, airtightness is lost, whereby performance of the ventilation seat deteriorates. Thus, the protective layer 301 of a nonwoven fabric material having flexibility and excellent durability and wear resistance is provided to protect the non-permeable layer 201.

Further, a non-permeable liquid adhesive with fluidity is used so as to permeate through surface voids in the upper surface of the nonwoven fabric layer and be coupled thereto, such that the bonding force between the non-permeable layer 201 and the protective layer 301 is increased.

The protective layer 301 may be of a nonwoven fabric, and the non-permeable layer 201 may be of a thermoplastic resin film so as to permeate through surface voids in the upper surface of the nonwoven fabric layer, such that the non-permeable layer 201 and the protective layer 301 are thermally fused together.

When the non-permeable layer 201 is made of a thermoplastic resin material, the non-permeable layer is allowed to have fluidity by being heated in the assembly process of the cushion cover 100, whereby some of the non-permeable layer 201 permeates through the surface voids in the upper surface of the nonwoven fabric layer and is thermally fused. Accordingly, the manufacturing process can be shortened, and the manufacturing cost can be reduced by eliminating the second adhesive layer 103.

Although an exemplary form of the present disclosure has been described for illustrative purposes, those skilled in the art will appreciate that various modifications, additions and substitutions are possible, without departing from the scope and spirit of the present disclosure.

What is claimed is:

1. A cushion cover for a ventilation seat, the cushion cover comprising:
    a first adhesive layer including an upper surface and a lower surface, the upper surface coupled to a lower surface of a cushion part of a ventilation seat, the lower surface of the cushion part provided with an air flow channel;
    a non-permeable layer made of a non-permeable material and including an upper surface and a lower surface, wherein the upper surface of the non-permeable layer is coupled to the lower surface of the first adhesive layer and the air flow channel of the cushion part is sealed by the upper surface of the non-permeable layer such that air in the air flow channel is circulated in the air flow channel without escaping through the non-permeable layer;
    a protective layer coupled to the lower surface of the non-permeable layer to prevent direct contact between the non-permeable layer and a seat structure; and
    a second adhesive layer provided between the non-permeable layer and the protective layer and configured to couple the non-permeable layer and the protective layer together such that the non-permeable layer is compatible with and attached to any shapes of the lower surface of the cushion part.

2. The cushion cover of claim 1, wherein both the first adhesive layer and the second adhesive layer are in a form of a double sided adhesive tape.

3. The cushion cover of claim 2, wherein the first adhesive layer is made of a non-permeable adhesive, and the non-permeable adhesive is a liquid with fluidity so as to permeate through surface voids in the lower surface of the cushion part of the ventilation seat, such that the cushion part of the ventilation seat and the non-permeable layer are coupled together.

4. The cushion cover of claim 1, wherein both the first adhesive layer and the second adhesive layer are in a form of a non-permeable adhesive.

5. The cushion cover of claim 4, wherein the non-permeable adhesive is in a form of an acrylic pressure sensitive adhesive (PSA).

6. The cushion cover of claim 4, wherein the protective layer is made of a nonwoven fabric, and the non-permeable adhesive is a liquid with fluidity so as to permeate through surface voids in an upper surface of the nonwoven fabric layer, such that the non-permeable layer and the protective layer are coupled together.

7. The cushion cover of claim 1, wherein the non-permeable layer is made of at least one of an olefin based resin, a urethane based resin, a polyethylene terephthalate (PET) resin, or a polypropylene (PP) resin.

8. The cushion cover of claim 7, wherein the non-permeable layer is made of a material of the PP resin added with PP elastomer.

9. The cushion cover of claim 1, wherein the protective layer is of a nonwoven fabric.

10. The cushion cover of claim 1, wherein the protective layer is made of a nonwoven fabric, and the non-permeable layer is made of a thermoplastic resin film so as to permeate through surface voids in an upper surface of the nonwoven fabric layer, such that the non-permeable layer and the protective layer are thermally fused together.

* * * * *